July 21, 1925.

Re. 16,125

H. F. SCHMIDT

TRACTOR

Original Filed Feb. 9. 1918 5 Sheets-Sheet 1

Inventor
H. F. Schmidt
by
Attorneys

July 21, 1925.

Re. 16,125

H. F. SCHMIDT

TRACTOR

Original Filed Feb. 9. 1918 5 Sheets-Sheet 2

Inventor
H. F. Schmidt
by
Attorney

July 21, 1925.

Re. 16,125

H. F. SCHMIDT

TRACTOR

Original Filed Feb. 9. 1918 5 Sheets-Sheet 3

Inventor
H. F. Schmidt
by G. F. Dalvin Attorney

July 21, 1925.

H. F. SCHMIDT

Re. 16,125

TRACTOR

Original Filed Feb. 9. 1918 5 Sheets-Sheet 4

Inventor
H. F. Schmidt
by
Attorney

July 21, 1925.

Re. 16,125

H. F. SCHMIDT

TRACTOR

Original Filed Feb. 9. 1918 5 Sheets-Sheet 5

Inventor

H. F. Schmidt by

Attorneys

Reissued July 21, 1925. Re. 16,125

UNITED STATES PATENT OFFICE.

HUGO F. SCHMIDT, OF MILWAUKEE, WISCONSIN.

TRACTOR.

Original No. 1,356,744, dated October 26, 1920, Serial No. 216,303, filed February 9, 1918. Application for reissue filed December 24, 1920. Serial No. 433,054.

*To all whom it may concern:*

Be it known that I, HUGO F. SCHMIDT, a citizen of the United States, residing at 2708 Chestnut Street, Milwaukee, Milwaukee County, Wisconsin, formerly residing at 2245 North Kedize Boulevard, Chicago, Cook County, Illinois, have invented new and useful Improvements in Tractors, of which the following is a specification.

This invention relates to improvements in tractors for general haulage and power purposes and among the objects of the invention are to provide a machine adapted for use on a farm in connection with any one of the standard farming implements in common use, without any alteration of the latter whatever, the machine being so designed and arranged that the various implements may be interchangeably connected to it and pulled or dragged in much the same manner as could be done with teams of horses. Other objects of the invention are to provide a machine of the nature described which shall be light, strong and powerful and adapted for use over rough and broken ground and through soft soil and mud; and, in order to attain such other objects to the fullest extent, it has been necessary, therefore, to provide a frame structure adapted for such service and a linked track or drive chain for carrying the weight of the machine over the ground.

A machine embodying the principles of the invention is illustrated in the accompanying drawings in which.

Figure 1:
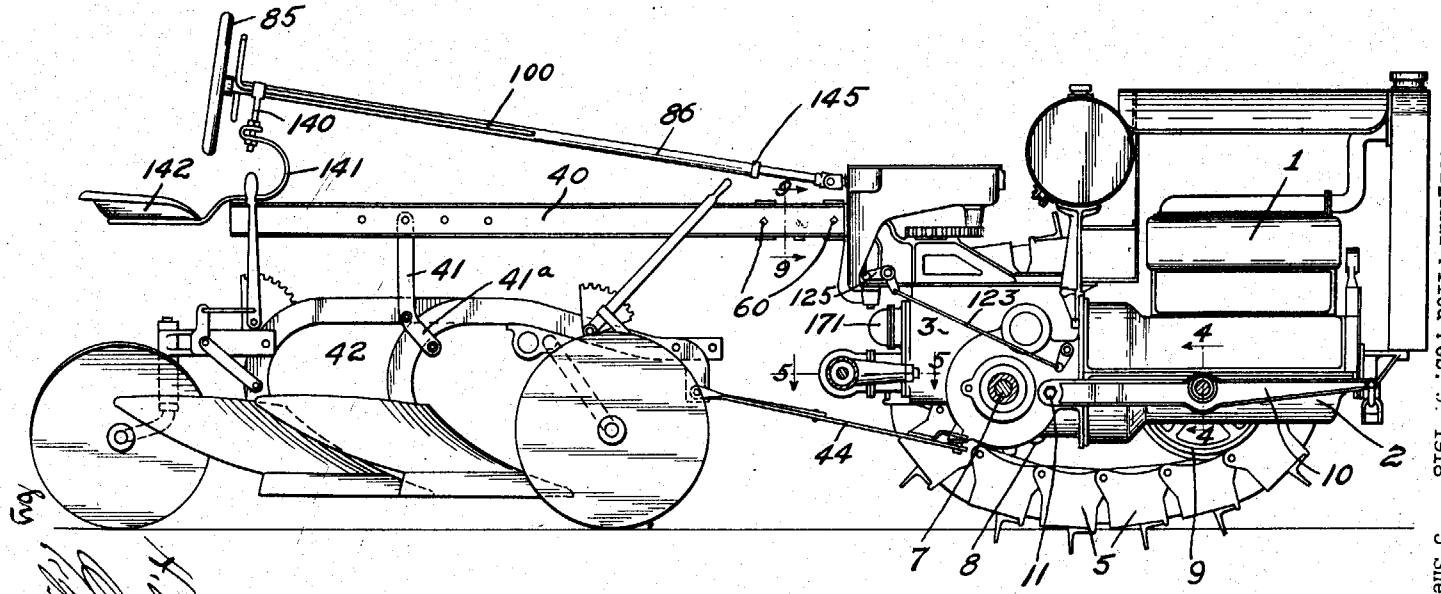
Figure 1 is a view of the complete tractor in side elevation.
Figure 2:
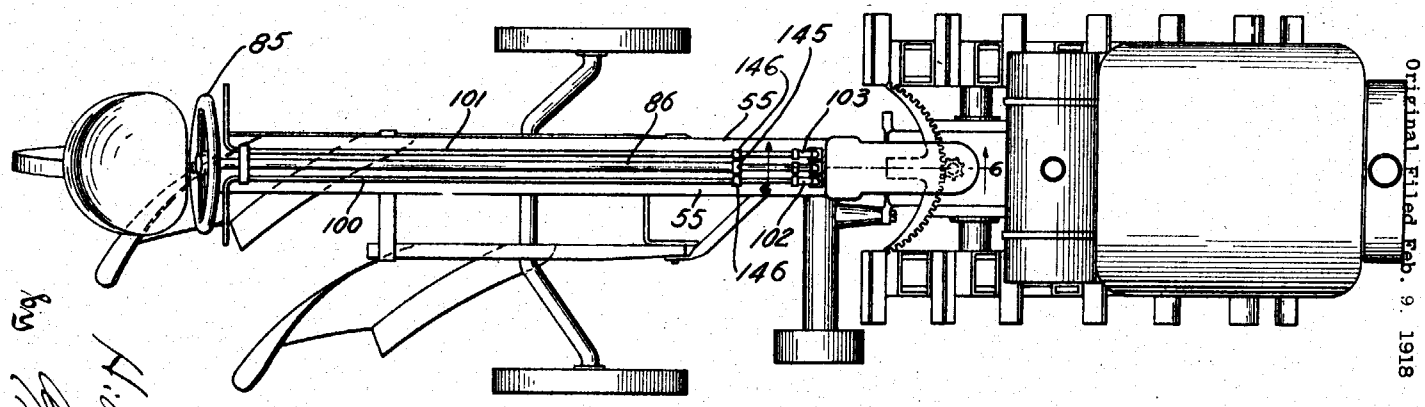
Fig. 2 is a top plan view.

As shown in said drawings, the complete tractor power unit is made with a unitary frame structure comprising an engine or power plant and a gear set housing bolted together, these parts being supported directly on wheels which rest on a pair of continuous linked tracks or drive chains, so that no other frame of any sort is required. Accordingly there is shown an engine, preferably of the ordinary internal combustion type, comprising a set of cylinders, 1, and a crank case, 2, to which there is bolted a transmission gear-set housing 3. These parts form a unitary frame structure, rigid and strong, providing journals and supports for all of the moving parts of the mechanism; and their weight is carried on a pair of endless linked tracks, or chains 5, one on each side of the machine. Within the transmission gear-set housing are arranged the driving gears for providing the necessary changes of gear combination, and for reversing, the machine being driven through a pair of drive shafts 7 having at their outer ends driving sprockets 8, which mesh into the drive chains 5; the weight of the front end of the machine being carried on the drive chains by idler wheels 9.

Figure 4:
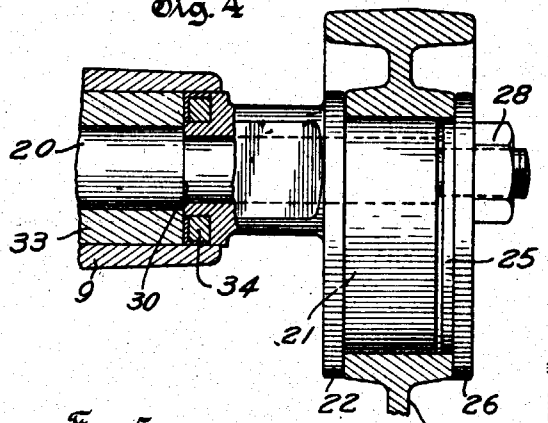
Fig. 4 is a transverse vertical section on the line 4—4 of Fig. 1.
Figure 5:
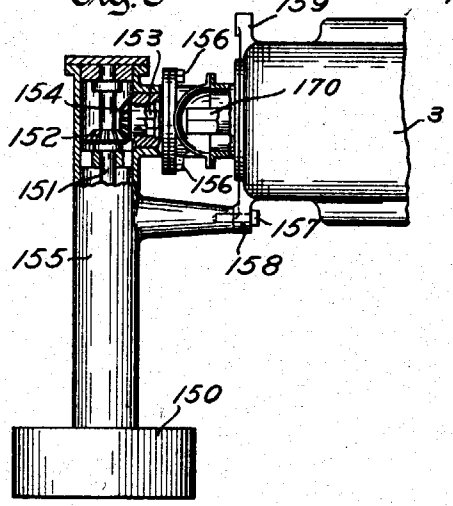
Fig. 5 is a horizontal section on the line 5—5 of Fig. 1.
Figure 3:
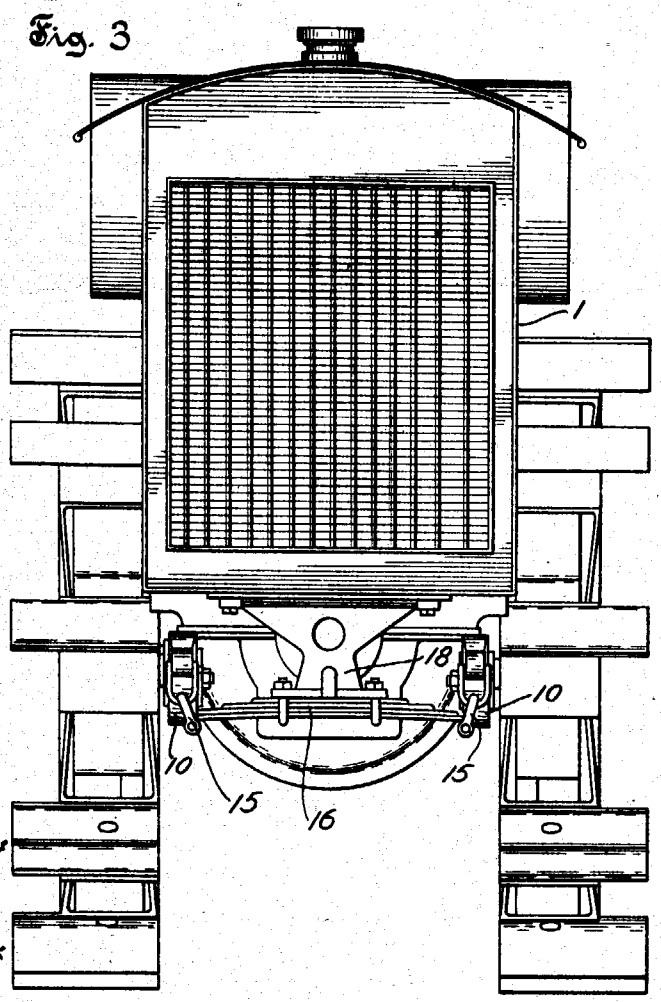
Fig. 3 is a view in front elevation.
Figure 6:
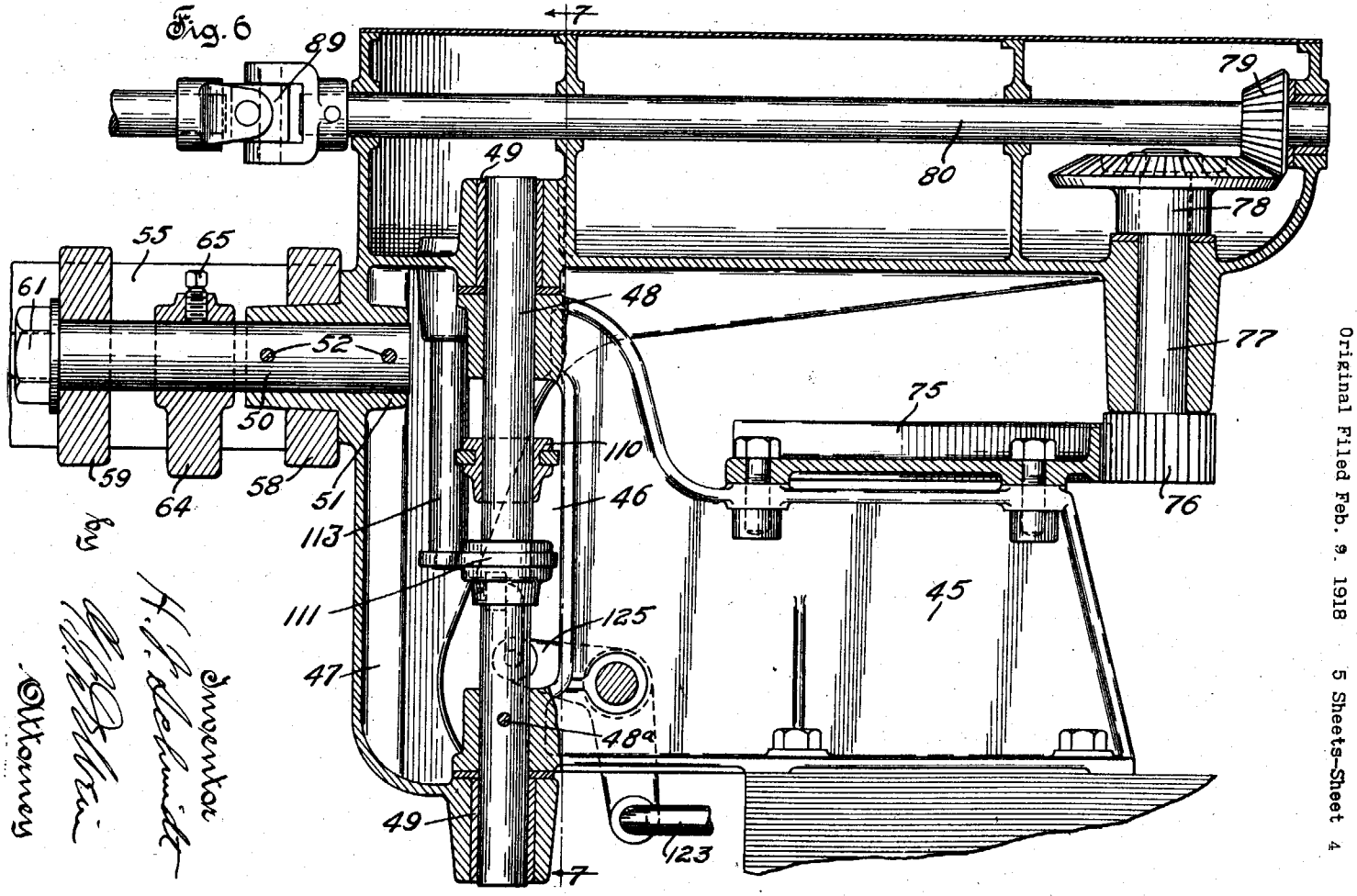
Fig. 6 is a longitudinal vertical section on the line 6—6 of Fig. 2.
Figure 8:
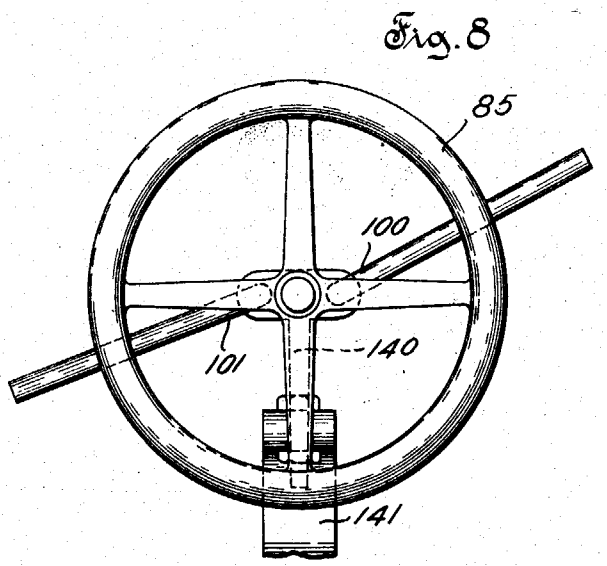
Fig. 8 is a view in rear elevation showing the steering wheel and control levers.
Figure 9:
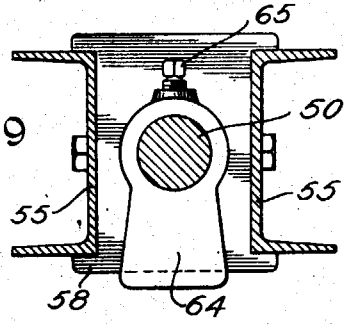
Fig. 9 is a transverse vertical section on the line 9—9 of Fig. 1.
Figure 7:
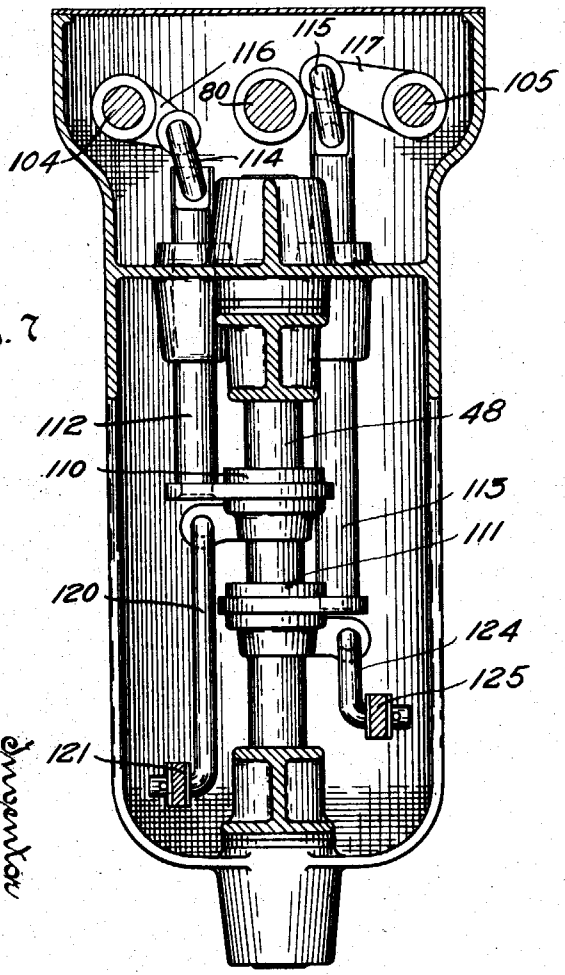
Fig. 7 is a transverse vertical section on the line 7—7 of Fig. 6.

On each side of the engine crank case 2 is a horizontal beam or bar 10, the rear end of which is connected to the transmission gear-set housing by a pivot bolt 11, and the front end of which is shackled by a pair of shackles 15 to the ends of a transverse spring, 16, carrying the weight of the forward part of the engine frame through a large bracket 18 bolted to the engine crank case. Each of these beams is supported between its ends on one of the idler wheels 9, the wheel being journaled on an axle shaft 20 which is fixed in the middle part of the beam. At about the center of each beam there is made a large opening to receive a cylindric part 21 (see Fig. 4) through which the shaft 20 extends eccentrically, so that by rotating the cylindric part the distance between the two wheels 8 and 9 may be varied to provide the necessary adjustment of chain tension. The part 21 is made with a projecting radial flange 22, and into the opening in the bar from the opposite side is fitted a corresponding circular plate or disk 25 with a similar flange 26. The axle shaft 20 extends through these two parts and is made with a projecting threaded end and is provided with a nut 28; and the axle shaft is also made with a ledge or shoulder 30, so that by tightening the nut 28 the two parts 21 and 25 may be clamped together to secure the axle shaft in its position of correct adjustment. The wheel 9 turns on the axle shaft 20 with the interposition of a bushing 33 and a thrust collar 34 to take the wear. The two endless linked tracks or chains 5 on each side of the machine are made in such form as to embody within them means for preventing the lower part or stretch of each chain, which is convex relatively to and rests on the ground and carries the weight of the machine, from bending up between the two wheels, the construction of these chains being more particularly set out in my co-pending application filed January 29, 1918, Serial No. 214,413, (now Patent 1,356,743).

As the machine is supported on the ground through these two chains alone, the lower stretches of which are convex as just described and as clearly shown in Fig. 1, other means must be provided to secure the necessary fore-and-aft stability and to provide for steering the machine, and accordingly there is secured to the rear part of the machine, joining the upper part of the transmission gear-set housing 3, a long horizontal beam or reach 40, extending rearwardly and adapted for connection through a link 41 and a clamp 41[a] to a wheeled plow or other standard farming implement 42; which latter is pulled or dragged by a drawbar 44, by being attached directly to the rear part of the machine or power unit as is clearly shown in Fig. 1.

The beam 40 is secured through a jointed connection to a large heavy bracket 45 which forms an integral part of the power-unit by being bolted upon the top of the transmission gear housing 3. This bracket is made with a pair of jaws 46 which are embraced in a large hood-shaped part, or steering head 47, and secured therein by a pivot- or king-bolt 48; the latter being pinned in one of the jaws (indicated at 48[a]) and journaled above and below in bushings 49. The part 47 carries a short, fixed, rigid stub shaft 50 which is fixed in a bracket or boss 51 and secured by pins 52. The beam or backbone 40 of the machine is made of two channel members 55, arranged parallel and side by side, and joined together at their forward ends by a pair of spacing blocks 58 and 59, to which they are secured by bolts 60. The shaft 50 extends through openings in these blocks and is provided with a nut 61 to hold the parts together, thereby forming a swivel connection between the beam and the bracket 47 to allow a certain amount of twisting of the beam 40; this twisting movement being limited by a stop member 64 secured to the shaft 50 by a set nut 65. The beam or reach 40, shaft 50, bracket 47 and king-bolt 48 constitute coupling means between the power unit and the implement to be pulled or dragged.

In order to impart the necessary turning movement about the pivot- or king-bolt 48 for steering the vehicle, there is bolted to the top of the bracket member 45 a horizontal gear segment 75, and meshing therewith is a pinion 76 on the lower end of a vertical shaft 77, journaled in the forward part of the hood-shaped member 47. To the upper end of the shaft 77 is fixed a large bevel gear 78, and meshing therewith is a bevel pinion 79 on the forward end of a horizontal steering shaft 80. The machine is provided with a steering wheel 85 and a steering column 86 which is connected through a universal joint 89 with the steering shaft 80, so that by turning the parts through the movement of the steering wheel the course of the machine is directed by the wheels of the implement drawn behind.

Besides the steering of the machine, its control is effected through a pair of control rods, 100 and 101, which are arranged on each side of the steering column 86 and similarly connected through universal joints, 102, and 103, to short shafts, 104 and 105 respectively, which are journaled on each side of the steering shaft 80. The control rods 100, 101, at their rear ends are bent outwardly at right angles and extend in proximity to the steering wheel 85 and terminate beyond the periphery of said steering wheel so as to be conveniently operable. On the king-bolt 48 and accommodated between the jaws of the supporting bracket 49 are a pair of sliding hubs, 110 and 111, which are connected through vertical sliding rods, 112 and 113, and links, 114 and 115, to cranks, 116 and 117, on the two shafts, 104 and 105 respectively. The hub 110 is connected through a rod 120 to a bell crank lever 121 which controls the clutching and unclutching and the braking of the machine through a rod 123 (see Fig. 1); and the hub 111 is similarly connected through a rod 124 to a bell crank lever 125 which controls the gear changes and the reverse gear combination in the transmission gear-set housing. It is intended that the running of the engine shall be automatically controlled through a governor on the throttle, and automatic shifting of the spark or ignition points, so that the tractor is entirely controlled through the steering wheel 85 and the two control rods or levers, 100 and 101. These parts are supported at their ends by a short post 140 which is connected to the rear end of the beam 40 by a curved spring 141; the spring being continued backward to support a seat 142 for the driver so that not only is his weight carried by a spring support, but vibration from the machine is absorbed through the spring connection 141 between the beam 40 and the steering wheel and control levers. When the machine is used with some of the standard farming implements, which are considerably longer than the wheeled plow here shown, it is advantageous to detach the spring 141, with the seat 142 and the steering column and control levers, from the beam 40 and mount them on the rear part of the implement; this being permitted by telescopic joints 145 and 146, in the column and in the control rods respectively.

The machine is provided with a belt pulley 150 to adapt it for general power purposes, this pulley being fixed on the end of a transverse horizontal shaft 151 carrying a bevel gear 152. The engine clutch shaft is continued rearwardly through the gear-set housing and its rear end is squared, as indicated at 153, to engage in a squared opening in the hub of a bevel gear 154 meshing with the gear 152. The shaft 151 is journaled in a sleeve 155 which is bolted to the end of the gear housing by a pair of symmetrically arranged bolts 156 and a bolt 157, the latter engaging in a projection 158 at one side of the gear housing. On the other side of the housing is a similar projection 159, so that if desired the sleeve may be turned about and bolted to the latter projection, thus bringing the belt pulley 150 on the other side of the machine; or when not required the sleeve and shaft may be removed entirely. As the particular arrangement of the clutch and the change gears within the housing 3 is no necessary part of the present invention, they are not here shown, but their design includes a counter shaft 170 which likewise extends back through the rear wall of the gear-set housing and is squared, as indicated at 170, and covered by a removable cap or cover 171, so that this shaft can be used also for imparting movement to the machinery of one of the implements used in connection with the machine.

By means of the construction above described, with the engine and gear-set housing forming a unitary frame structure, it is possible to make the tread, or width, of the complete tractor little greater than the width of the engine; so that the tractor as here shown may operate between rows of corn for plowing and planting other crops, in accordance with approved farming methods. While the tread is thus made narrow, stability is obtained through a low center of gravity—an advantage secured through the use of the two linked tracks instead of large wheels of equivalent diameter.

An additional advantage of the narrow tread is that in plowing the tractor may run entirely on the solid ground while the plow would have one wheel on the unbroken ground and one wheel in the furrow previously cut.

It is claimed and desired to secure by Letters Patent:

1. In a tractor, a power unit, a swingable element vertically pivotally connected to said unit, a beam member horizontally pivotally connected to and extending away from said element, and control means for said unit supported by said beam member.

2. In a tractor, a power unit, a swingable element vertically pivotally connected to said unit, a beam member horizontally pivotally connected to and extending away from said element, control means for said unit supported by said beam member, and means coacting with said beam member to sustain the same in desired position.

3. In a tractor, a power unit, a swingable element vertically pivotally connected to and extending away from said unit, the pivot being located out of the plane of the transverse axial center of said unit, a beam member horizontally pivotally connected to and extending away from said element, and control means for said unit supported by said beam member.

4. In a tractor, a power unit supported by two traction elements located one on each side of said unit, a swingable element vertically pivotally connected to said unit, a beam member horizontally pivotally connected to and extending away from said swingable element, control means for said unit supported by said member, and means coacting with said beam member to sustain the same in desired position.

5. In a tractor, a power unit supported by two traction elements located one on each side of said unit, a device to be transported over the ground, a beam member horizontally and vertically pivotally associated with said unit and co-operating with said device to prevent tilting of said unit, and a direct draft connection between said unit and said device.

6. In a tractor, a power unit supported by two traction elements located one on each side of said unit, a device to be transported over the ground, a beam member horizontally pivotally associated with said unit and co-operating with said device to prevent tilting of said unit, and a direct draft connection between said unit and said device.

7. In a tractor, a power unit or device supported by two traction elements located one on each side of said unit, a device to be transported over the ground, a beam member associated with said devices to prevent tilting of said unit, and said association of said beam member with one of said devices including a horizontal pivotal connection located in line with said beam member, and a direct draft connection between said unit and said transportable device.

8. In a tractor, a power plant supported by two traction elements located one on each side thereof, coupling means for connecting said power plant to one of a variety of devices to be drawn to effect fore-and-aft stability of the tractor, a horizontal pivotal connection between said coupling means and said power plant, and separate mechanism for transmitting the draft of the tractor from said power plant to said drawn device.

9. In a tractor, a power unit, a beam member horizontally and vertically pivotally connected to and extending away from said unit, control means for said unit supported by said beam member, and means coacting with said beam member and with the ground to sustain said member in desired position.

10. In a tractor, a power unit, a swingable element vertically pivotally connected to said unit, a beam member extending away from said element, control means for said unit supported by said member, and means connecting said member and said element for permitting oscillation of said member about its longitudinal axis.

11. In a tractor, a power unit supported by two traction elements located one on each side of said unit, a swingable element vertically pivotally connected to said unit, a beam member extending away from said element, control means for said unit supported by said member, and a connection between said member and said element for permitting oscillation of said member about its longitudinal axis.

12. In a tractor, a power unit, a swingable element vertically pivotally connected to said unit, a beam member extending away from said element, control means for said unit supported by said member, means connecting said member and said element for permitting oscillation of said member about its longitudinal axis, and a device to be transported over the ground connected to said member.

13. In a tractor, a power unit supported by two traction elements located one on each side of said unit, a swingable element vertically pivotally connected to said unit, a beam member extending away from said element, control means for said unit supported by said member, a connection between said member and said element for permitting oscillation of said member about its longitudinal axis, and a device to be transported over the ground connected to said member.

14. The combination in a tractor, of a power unit, control means for said unit, a yoke member vertically pivoted and horizontally movable with respect thereto, a beam extending rearwardly from said yoke member and operative to support said control means, and means operative to connect said beam and said yoke member and permit the oscillation of said beam with respect to said yoke member about the longitudinal axis of said beam.

15. In a tractor, frame structure supported by two traction elements located one on each side thereof and adapted for coupling to a farm implement, a beam vertically and horizontally pivotally associated with said frame structure and extending rearwardly over the implement, means for effecting relative swinging of said beam and said frame structure, a driver's seat, and a single element associated with said beam for supporting both said swing-effecting means and said seat.

16. In a tractor, a power unit, a swingable element vertically pivotally connected to said unit, a pair of rearwardly extending members having between them a horizontal pivot for associating same with said swingable element, and control means for said unit supported by said members.

17. In a tractor, a power unit, a swingable element vertically pivotally connected to said unit, a beam member comprising a pair of parallel channel members having between them a horizontal pivot for connecting same to said element, and control means for said unit supported by said beam member.

18. In a tractor, a power unit, an element vertically pivotally connected to said unit, said element having a rearwardly extending portion, and a beam member comprising spaced members extending rearwardly from said element and embracing said rearwardly extending portion thereof, said beam member being movable about its longitudinal axis.

19. A tractor comprising a power unit, traction elements supporting said unit, a yoke movable with respect to said unit, and a beam comprising spaced members extending rearwardly from and embracing a portion of said yoke, supported thereby, and movable with respect thereto about its longitudinal axis.

20. A tractor comprising a power unit, a pair of traction elements supporting said unit, a yoke horizontally movable with respect to said unit, a bracket or boss extending rearwardly from said yoke, a beam comprising a pair of laterally spaced members disposed one on each side of said boss, operatively supported thereby and movable about a longitudinal axis with respect thereto.

21. The combination with a tractor having a power unit, a pair of traction elements supporting said unit, a yoke horizontally movable with respect to said unit, a block supported in operative relation with respect to said yoke and movable relatively thereto about a horizontal axis, and a pair of spaced members operatively rigidly secured one on each side of said block and extending rearwardly therefrom forming a beam for the tractor, of a trailing implement, and means for operatively securing said implement to said beam whereby said implement and said beam are adapted to move unitarily with respect to said yoke.

22. A tractor comprising a frame structure supported on a pair of endless linked tracks and adapted for coupling to an implement, a forked bracket on the frame structure, a steering head connected to the bracket through a vertical pivot bolt, a horizontal beam extending rearwardly over the implement and swiveled at its forward end to the steering head, a steering gear between the head and the bracket to turn the bracket on its pivot, a steering column supported by the beam and connected to the steering gear, a control rod arranged above the beam, and means for connecting the control rod to the mechanism of the machine, such means including a part sliding vertically on the pivot bolt.

23. A tractor comprising a frame structure supported on a pair of endless linked tracks and adapted for coupling to a farming implement, a beam extending rearwardly over the implement from the tractor frame and connected thereto, a forked bracket on the frame structure, a hinged joint connecting the beam to the bracket through a vertical pivot bolt engaging the two jaws of the bracket, a driver's seat at the rear end of the beam, a steering column and a control rod arranged above the beam, a gear segment on the bracket, a pinion meshing therewith to control the steering head, means for connecting the steering column to the pinion, a crank arm connected to the control rod, a sliding part on the pivot bolt, and means for connecting the sliding part to the crank arm and to the mechanism of the tractor, whereby such mechanism is controlled independently of the operation of the steering gear.

24. A tractor comprising an engine and a gear set housing forming a unitary frame structure supported on a pair of endless linked tracks and adapted for coupling to a farming implement, driving sprockets meshing in the linked tracks, a horizontal beam on each side of the frame structure, a pivotal connection between one end of each beam and the frame structure, a load supporting spring shackled to the opposite end of each beam, and a wheel carrying the load at the middle part of each beam on the corresponding linked track.

25. A tractor comprising an engine and a gear set housing forming a unitary frame structure supported on a pair of endless linked tracks and adapted for coupling to a farming implement, driving sprockets meshing in the linked tracks, a horizontal beam on each side of the frame structure, a pivotal connection between one end of each beam and the frame structure, a load supporting spring shackled to the opposite end of each beam, a wheel carrying the load at the middle part of each beam on the corresponding linked track, and means for adjustably varying the position of the wheel with respect to an end of the beam to vary the chain tension.

26. In a tractor, a frame, and a traction element both pivotally and resiliently associated with said frame, said traction element comprising a driving sprocket, an idler wheel spaced from said sprocket, a chain having stretches extending from said sprocket to said idler wheel and embodying means for preventing inward bending of said stretches, means for maintaining spaced relation between said sprocket and said idler wheel, and adjusting means for varying the distance between said sprocket and said idler wheel to vary the tension of said chain.

27. In a tractor, a frame, and a traction element both pivotally and resiliently associated with said frame, said traction element comprising a driving sprocket, an idler wheel spaced from said sprocket, a chain having stretches extending from said sprocket to said idler wheel and embodying means for preventing inward bending of said stretches, a beam for maintaining spaced relation between said sprocket and said idler wheel, and an adjustable eccentric between said beam and said idler wheel for varying the distance between said sprocket and said idler wheel to vary the tension of said chain.

28. In a tractor, a power unit, a swingable element vertically pivotally connected to said unit, a beam member horizontally pivotally connected to and extending away from said element, and means independent of draft function for limiting the extent of relative oscillation of said beam member and said element.

29. In a tractor, a power unit, a swingable element vertically pivotally connected to said unit, a beam member horizontally pivotally connected to and extending away from said element, means independent of draft function and coacting with said beam member to limit the extent of relative oscillation of said member and said element, and control means for said unit supported by said beam member.

30. In a tractor, a power unit, a swingable element vertically pivotally connected to said unit, a beam comprising a pair of laterally spaced members horizontally pivotally connected to and extending away from said element, means associated with said element and located between said members for limiting the extent of oscillation of said beam about its horizontal pivot, and control means for said unit supported by said beam.

31. In a tractor, a power unit, a swingable element vertically pivotally connected to said unit, a pair of rearwardly extending laterally spaced members located in proximity to said element, spacing blocks secured to said members, and means associated with said element and coacting with said blocks to provide a horizontal pivotal connection between said members and said element.

32. In a tractor, a power unit, a swingable element vertically pivotally connected to said unit, a beam member horizontally pivotally connected to and extending away from said element, a steering rod extending longitudinally of said member and adapted to swing said member relatively to said unit, and rotary control rods for said unit extending parallel to said steering rod, said control rods and said steering rod being supported by said beam member.

33. In a tractor, a power unit, a beam member connected on a horizontal pivot to said unit, and one of several interchangeable implements removably associated with said beam member, said implement forming the sole means for providing fore-and-aft stability of the tractor.

34. In a tractor, a power unit, a beam member connected on a horizontal pivot to said unit, control means for said unit supported by said beam member, and one of several interchangeable implements removably associated with said beam member to sustain the same in desired position.

35. In a tractor, a power unit, a device extending rearwardly of said power unit, a vertical pivotal connection between said unit and said device, and means including an element on said power unit located forwardly of said pivotal connection and a second element supported by said device and located forwardly of said pivotal connection and coacting with said first element to effect steering of said tractor.

HUGO F. SCHMIDT.